Figure 1:
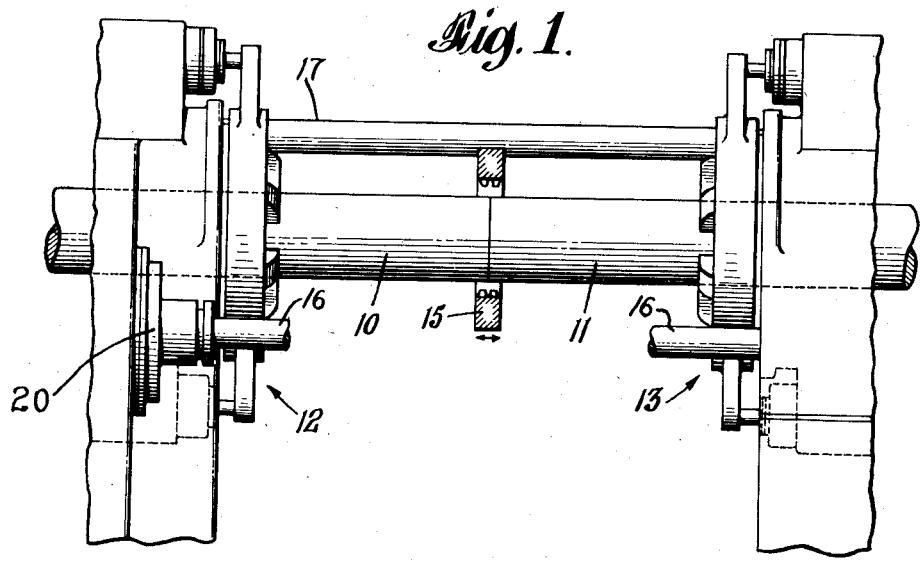

Aug. 29, 1944.   S. B. KIRK   2,356,854
METHOD FOR TREATING WELDS
Filed July 29, 1943

INVENTOR
STANLEY B. KIRK
BY
ATTORNEY

Patented Aug. 29, 1944

2,356,854

UNITED STATES PATENT OFFICE 2,356,854

METHOD FOR TREATING WELDS

Stanley B. Kirk, New Rochelle, N. Y., assignor to The Linde Air Products Company, a corporation of Ohio Application July 29, 1943, Serial No. 496,554

3 Claims. (Cl. 205—8)

Among the several methods which have been used for welding together metal members, one of the more recent to reach a widely practicable stage of perfection is that generally termed "pressure welding."

In this method, clean metal surfaces of the members to be joined are abutted under moderate pressure and heat is applied to the outside of the members at and adjacent to the joint, usually by an oscillating bank of oxyacetylene flames played to and fro across the joint, until the metal at the abutting surfaces has reached a temperature in the neighborhood of the solidus, whereupon the pressure urging the two members together is considerably increased to effect the weld.

The welds produced by this method have, among other virtues, a strength similar to that in parts of the members remote from the joint and a metallographic structure free from abrupt changes anywhere in the weld region.

A necessary result accompanying the making of a pressure weld is the upsetting of metal at and adjacent the weld. Sometimes the upset metal may be left as a reinforcement, but more often it is undesirable to have a mass of metal at the joint protruding beyond the general level of the surrounding surfaces. In the latter case, it is customary to remove the excess metal by either mechanical or flame machining. Alternatively, the edges of the surfaces to be joined may be bevelled before welding so that the upset metal will not extend substantially beyond the original surface level of the members.

Although the procedures just described for eliminating an excess of upset metal are entirely satisfactory in their results, they require extra labor and extra cutting tools, a circumstance which is sometimes undesirable. A principal object of this invention is to provide a method for eliminating at least the major part of the upset produced by a pressure weld, which method shall not require the use of cutting tools either to bevel the edges of the surfaces to be welded nor to cut off the upset metal.

The invention is of especially great advantage in the pressure welding of round pipes, tubes, rods, and bars. Accordingly, for convenience, the invention will be described with particular reference to such articles; but it will be apparent as the description proceeds that the invention is not limited in its applicability to these articles. I contemplate its application to a wide variety of articles having any of a large number of shapes, and the description of its application to articles of circular cross section is merely by way of example.

The novel feature of this invention comprises, in its most general aspect, applying a tensile force to pressure welded members while only the upset portion of the weld region is at a high temperature, whereby the weld region is elongated and reduced in cross section. The result is the practical disappearance of the upset. Preferably, the tensile force is applied while the weld region is still hot from the pressure welding operation; but if the weld region has cooled it may be reheated to a suitable temperature.

In more particularly describing the invention, reference will be made to the accompanying drawing in which Fig. 1 is a diagrammatic representation of apparatus suitable for carrying out the method of the invention, showing end portions of two rods arranged in abutted position preparatory to the making of a pressure weld.

Figure 2:
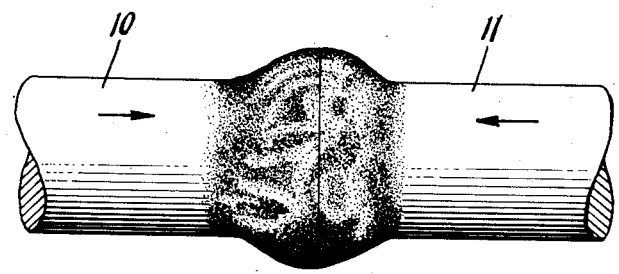
Figure 3:

Fig. 2 is a view of the rods of Fig. 1 after the completion of a pressure weld, showing the upset metal at the welding region, and Fig. 3 is a view of the welded joint of Fig. 2 after elimination of the upset by application of a force in tension.

Referring to the drawing, to practice the method of this invention according to a preferred procedure, clean end surfaces of two members such as pipes or bars 10 and 11 to be joined are juxtaposed, held in suitable gripping devices such as conventional chucks 12 and 13, and pressed firmly together by a suitable device such as a hydraulically or pneumatically operated cylinder 20 acting through rods 16 and 17. Such pressure serves not only to bring the surfaces into intimate contact but also to exclude oxidizing gases from the interface to be welded. To the welding region at and adjacent the interface, high temperature heating flames are applied, as by a ring-shaped oxyacetylene burner 15 which preferably travels to and fro along the welding region. When the surfaces to be joined have reached a welding temperature in the neighborhood of the solidus but well below the liquidus, the pressure applied by the cylinder 20 is increased to a value sufficient to upset a substantial amount of metal at the welding region. The general appearance of the joint will then be as illustrated in Fig. 2.

Alternatively, a constant heavy pressure may be maintained throughout the heating periods, the heating being stopped as soon as a predetermined amount of upsetting of metal has occurred.

After the weld is thus complete and while the metal is at a temperature as high as or not far below a welding temperature, a force intension is applied, as by operating the cylinder 20 in a reverse direction, such force being great enough to elongate the welding region and to reduce or eliminate the upset, as illustrated in Fig. 3. If the welding region has cooled far below the welding temperature, it may conveniently be reheated for the upset-reducing step by the same heating flames as were used for the welding operation, played to and fro over the welding region so as to heat most intensely the area of greatest upset.

One of the advantageous results of the method of the invention is that the grain structure of rolled members, distorted adjacent the weld by the upset during welding, is restored by the upset-reducing step to the normal straight-line orientation.

Thus, the invention provides an improved method for producing pressure welds characterized by little or no upset metal at the welding region, which method does not require cutting tools or other special equipment.

It is apparent that the invention is capable of numerous modifications and variations to fit specific circumstances. For instance, electrical induction heating may be substituted in some cases for heating flames. Also, the application of the tensile force may be continued if desired until the cross section at the welding region is reduced below that of the adjacent regions.

I claim:

1. A method of treating pressure welds between metal members to reduce the cross section at the welding region only which comprises maintaining only such region at an elevated temperature below the liquidus but not far below the solidus, and applying to such members at right angles to the plane of said pressure weld a tensile force sufficient to elongate only the metal at the welding region and to reduce its cross section.

2. A method of treating pressure welds between metal members to reduce the cross section of upset metal at the welding region which comprises maintaining such region at a temperature below the liquidus but not far below the solidus by applying heating flame to and fro across said region, and applying to said members a tensile force sufficient to elongate the metal at the welding region and to reduce its cross section to approximately that of the adjacent metal of the members.

3. A method of treating pressure welds between cool metal members to reduce the cross section at the welding region only which comprises applying to said members at right angles to the plane of said pressure weld, promptly after welding and before said welding region has cooled far below the welding temperature, a tensile force sufficient to elongate only the metal at the welding region and to reduce its cross section.

STANLEY B. KIRK.